US009292691B1

(12) United States Patent
Hittel

(10) Patent No.: US 9,292,691 B1
(45) Date of Patent: Mar. 22, 2016

(54) SYSTEMS AND METHODS FOR PROTECTING USERS FROM WEBSITE SECURITY RISKS USING TEMPLATES

(71) Applicant: Symantec Corporation, Mountain View, CA (US)

(72) Inventor: Sean Hittel, Calgary (CA)

(73) Assignee: Symantec Corporation, Mountain View, CA (US)

( * ) Notice: Subject to any disclaimer, the term of this patent is extended or adjusted under 35 U.S.C. 154(b) by 9 days.

(21) Appl. No.: 14/207,513

(22) Filed: Mar. 12, 2014

(51) Int. Cl.
*G06F 21/57* (2013.01)

(52) U.S. Cl.
CPC ...................................... *G06F 21/57* (2013.01)

(58) Field of Classification Search
CPC ............ H04L 63/1416; H04L 63/1408; H04L 63/145; G06F 21/57; G06F 17/30864
See application file for complete search history.

(56) References Cited

U.S. PATENT DOCUMENTS

| | | | | |
|---|---|---|---|---|
| 5,581,664 | A * | 12/1996 | Allen et al. | 706/46 |
| 2006/0253345 | A1* | 11/2006 | Heber | 705/27 |
| 2008/0276234 | A1* | 11/2008 | Taylor et al. | 717/177 |
| 2009/0182759 | A1* | 7/2009 | Kirpal | 707/102 |
| 2009/0192968 | A1* | 7/2009 | Tunstall-Pedoe | 706/47 |
| 2012/0042280 | A1* | 2/2012 | Hoffman | 715/800 |

OTHER PUBLICATIONS

"ACE (Advanced Classification Engine)", http://www.websense.com/content/websense-advanced-classification-engine.aspx, as accessed Jan. 14, 2014, Websense, Inc., (Aug. 22, 2010).
"Web template system", http://en.wikipedia.org/wiki/Web_template_system, as accessed Jan. 14, 2014, Wikipedia, (Aug. 29, 2006).

* cited by examiner

*Primary Examiner* — Chau Le
*Assistant Examiner* — Ghodrat Jamshidi
(74) *Attorney, Agent, or Firm* — ALG Intellectual Property, LLC

(57) ABSTRACT

A computer-implemented method for protecting users from website security risks using templates may include (1) identifying a section of a website, the section being arranged according to a template that defines a layout for the website, (2) identifying a profile for the section that includes an attribute specific to the section, the attribute indicating acceptable content for the section of the website as distinct from acceptable content for the entire website, (3) identifying content placed within the section of the website in accordance with the template that defines the layout for the website, and (4) determining whether the identified content is acceptable by comparing the attribute specified in the profile for the section of the website to an attribute of the content placed within the section of the website. Various other methods, systems, and computer-readable media are also disclosed.

20 Claims, 7 Drawing Sheets

SYSTEMS AND METHODS FOR PROTECTING USERS FROM WEBSITE SECURITY RISKS USING TEMPLATES

BACKGROUND

Individuals and organizations frequently access various websites on the World Wide Web. These websites may provide news, webmail, encyclopedias, shopping experiences, video, and other multimedia, for example.

Unfortunately, not all websites on the World Wide Web may be safe for the end users who browse them. For example, hackers and other attackers may include malicious and inconspicuous exploits within websites and other website-related documents (e.g., webmail attachments, downloadable PORTABLE DOCUMENT FILES (PDFs), image files, etc.).

In view of the above, security vendors have attempted to protect users from the potential threats that websites can pose. For example, security vendors might create a profile for an entire website, and the profile might define acceptable and/or unacceptable features for the entire website.

Nevertheless, as discussed further in the detailed description below, some websites might contain multiple, independent sections, and a single overall security profile may not best protect such websites. The instant disclosure, therefore, identifies and addresses a need for improved systems and methods for protecting users from website security risks.

SUMMARY

As will be described in greater detail below, the instant disclosure describes various systems and methods for protecting users from website security risks using templates by comparing an attribute of a profile for a website section to an attribute of content placed within the website section. In one example, a computer-implemented method for protecting users from website security risks using templates may include (1) identifying a section of a website that is arranged according to a template that defines a layout for the website, (2) identifying a profile for the section that includes an attribute specific to the section that indicates acceptable content for the section of the website as distinct from acceptable content for the entire website, (3) identifying content placed within the section of the website in accordance with the template that defines the layout for the website, and (4) determining whether the identified content is acceptable by comparing the attribute specified in the profile for the section of the website to an attribute of the content placed within the section of the website.

In some embodiments, identifying the profile for the section that includes the attribute specific to the section may include creating the profile. The step of creating the profile may be performed by an owner of the website, an endpoint computing system that provides security for users accessing websites through the endpoint computing system, and/or a management server hosted by a security vendor.

In some examples, identifying the profile for the section that includes the attribute specific to the section may include adjusting the attribute. Adjusting the attribute may include training the profile, using machine learning, based on content that is known to be acceptable for the section of the website. Adjusting the profile may include assigning a factor to the profile that indicates acceptable content for the section of the website. The factor may include (1) presence of a text line having at least a predetermined length, (2) use of iframes, (3) percent encoding, (4) a ratio of concatenated strings to non-concatenated strings, and/or (5) use of content hosted on foreign domains.

In some embodiments, the template may include a style sheet that defines the layout for the website. In some examples, the method may further include identifying another profile for another section of the website that includes an attribute specific to the other section. In these examples, the attribute may indicate acceptable content for the other section of the website as distinct from acceptable content for the entire website and the profile for the section may indicate that some content is allowable that the other profile for the other section indicates is not allowable.

In some examples, determining whether the identified content is acceptable may include triggering a security event. The security event may include (1) enabling a no scripting mode, (2) creating a sandboxed copy of the website, and/or (3) preventing loading of the website.

In some embodiments, determining whether the identified content is acceptable may include obtaining a reputation for the website and/or the section of the website. In further examples, the reputation may be based on an age of the profile.

In some examples, the profile for the section that includes the attribute specific to the section may be digitally signed. The method may further include detecting that the profile for the section of the website includes a legacy version of the profile that is older than a more recent version of the profile. In some embodiments, determining whether the identified content is acceptable may include inhibiting access to the content until obtaining the more recent version of the profile.

In one embodiment, a system for implementing the above-described method may include (1) an identification module, stored in memory, that (a) identifies a section of a website that is arranged according to a template that defines a layout for the website, (b) identifies a profile for the section that includes an attribute specific to the section that indicates acceptable content for the section of the website as distinct from acceptable content for the entire website, and (c) identifies content placed within the section of the website in accordance with the template that defines the layout for the website, (2) a determination module, stored in memory, that determines whether the identified content is acceptable by comparing the attribute specified in the profile for the section of the website to an attribute of the content placed within the section of the website, and (3) at least one processor that executes the identification module and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a section of a website that is arranged according to a template that defines a layout for the website, (2) identify a profile for the section that includes an attribute specific to the section that indicates acceptable content for the section of the website as distinct from acceptable content for the entire website, (3) identify content placed within the section of the website in accordance with the template that defines the layout for the website, and (4) determine whether the identified content is acceptable by comparing the attribute specified in the profile for the section of the website to an attribute of the content placed within the section of the website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
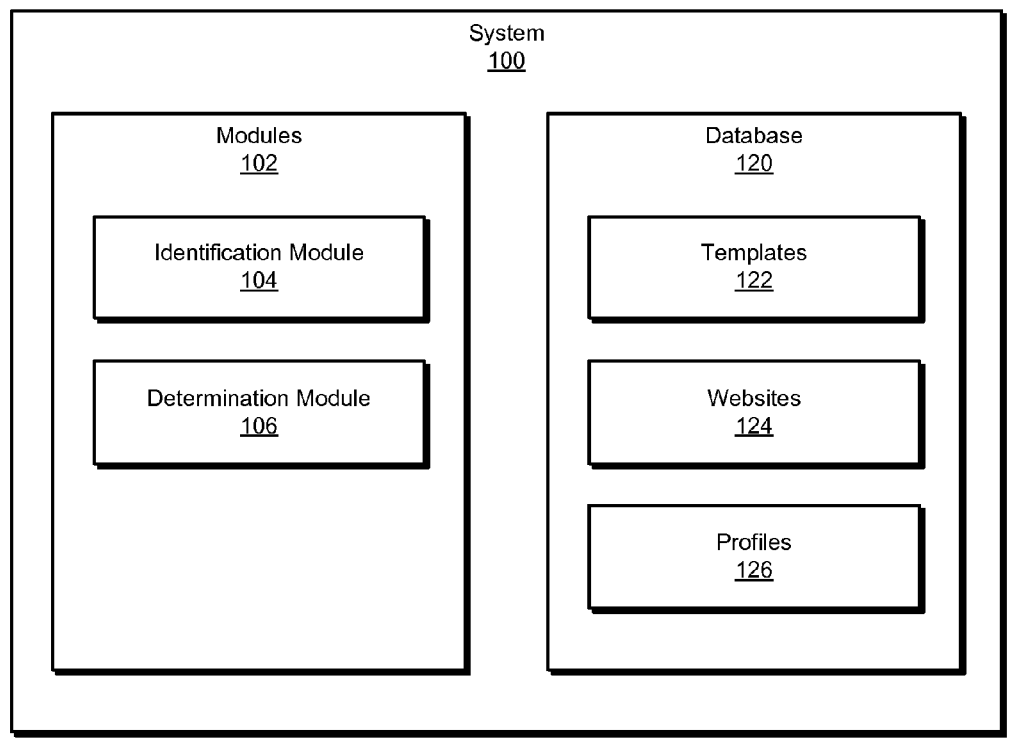
FIG. 1 is a block diagram of an exemplary system for protecting users from website security risks using templates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting users from website security risks using templates. As will be explained in greater detail below, the disclosed systems and methods may determine acceptable content for a section of a website, as distinct from the entire website. The disclosed systems and methods may, therefore, provide more granular evaluations of acceptable content for websites. For example, the disclosed systems and methods may use a higher sensitivity to unacceptable content for one section of a website (along one or more dimensions or types of content), while using a lower sensitivity to unacceptable content for another section (or remainder) of the website. Conventional techniques may be unable to use a higher sensitivity without applying the higher sensitivity to the entire website. These conventional systems may thereby create false positives when the higher sensitivity triggers security events for sections of websites that contain suspicious but ultimately safe content. In general, the disclosed systems and methods provide a technique for more effectively, and in a more granular manner, monitoring and processing (e.g., filtering) content placed within a section of a website using a template system.

Figure 2:
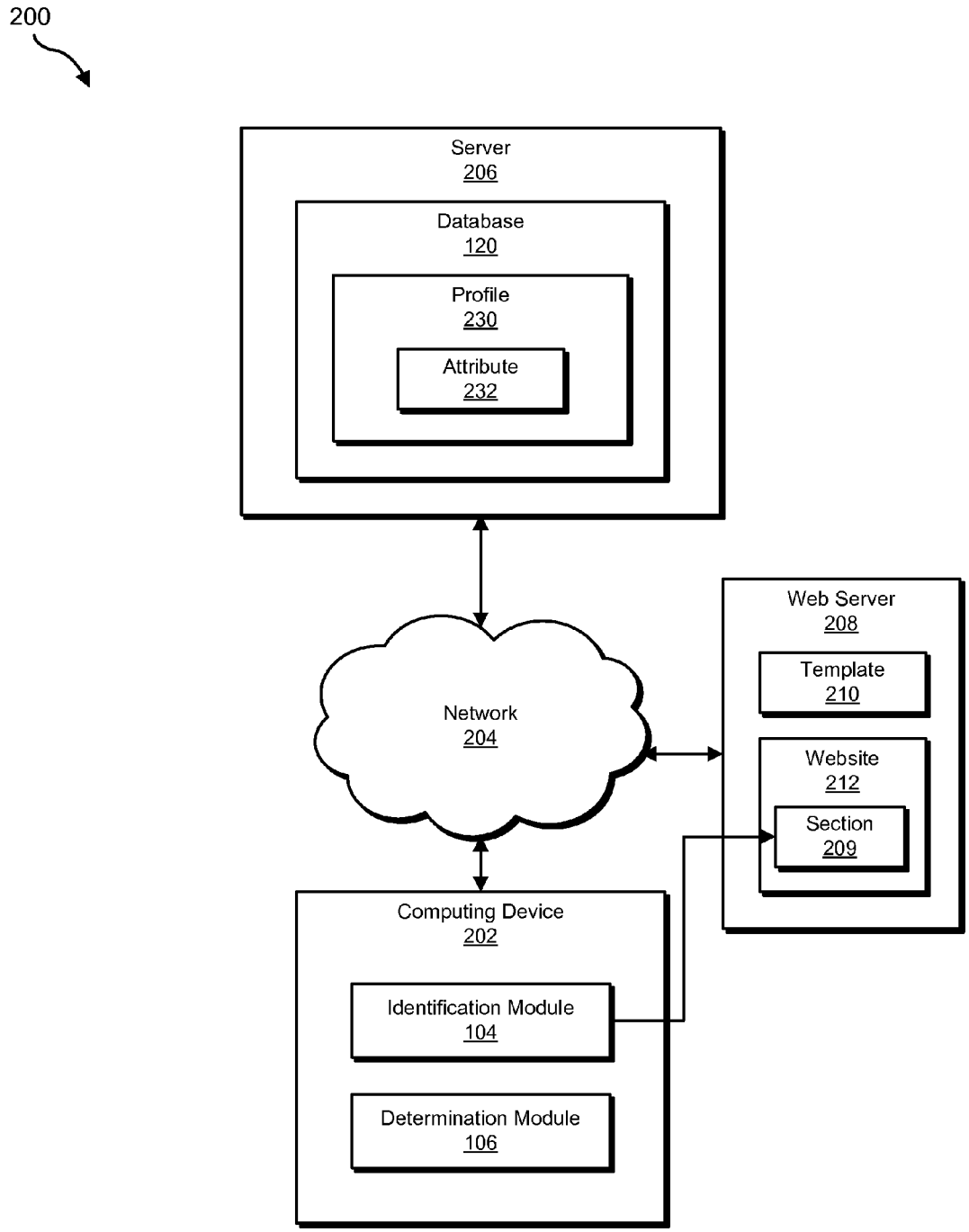
FIG. 2 is a block diagram of an additional exemplary system for protecting users from website security risks using templates.

The following will provide, with reference to FIGS. 1-2, detailed descriptions of exemplary systems for protecting users from website security risks using templates. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for protecting users from website security risks using templates. As illustrated in this figure, exemplary system 100 may include one or more modules 102 for performing one or more tasks. For example, and as will be explained in greater detail below, exemplary system 100 may include an identification module 104 that identifies a section of a website that is arranged according to a template that defines a layout for the website. Identification module 104 may also identify a profile for the section that includes an attribute specific to the section. The attribute may indicate acceptable content for the section of the website as distinct from acceptable content for the entire website. Moreover, identification module 104 may identify content placed within the section of the website in accordance with the template that defines the layout for the website. Exemplary system 100 may also include a determination module 106 that determines whether the identified content is acceptable by comparing the attribute specified in the profile for the section of the website to an attribute of the content placed within the section of the website.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store templates 122, which may indicate how data is arranged within a website, as discussed further below. Database 120 may also be configured to store websites 124, which may be based on templates 122. As a last example, database 120 may also be configured to store profiles 126, which may define acceptable or unacceptable content for a section of a website, as distinct from the entire website, and as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 and/or server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to protect users from website security risks using templates. For example, and as will be described in greater detail below, one or more of modules 102 may cause computing device 202 and/or server 206 to identify a section 209 of a website 212, which may be hosted on a web server 208. Section 209 may be arranged according to a template 210 that defines a layout for website 212. One or more of modules 102 may also cause computing device 202 and/or server 206 to identify a profile 230 for section 209 that includes an attribute 232 specific to section 209 that indicates acceptable content for section 209 of website 212 as distinct from acceptable content for the entirety of website 212. One or more of modules 102 may also cause computing device 202 and/or server 206 to identify content placed within section 209 of website 212 in accordance with template 210 that defines the layout for website 212. Lastly, one or more of modules 102 may also cause computing device 202 and/or server 206 to determine whether the identified content is acceptable by comparing attribute 232 specified in profile 230 for section 209 of website 212 to an attribute of the content placed within section 209 of website 212.

In the example of FIG. 2, a user at computing device 202 may desire to browse through one or more websites, such as website 212. The user may operate a web browser to retrieve and/or display these websites. Nevertheless, the user may benefit from security software that monitors and/or processes (e.g., filters) content within websites to protect the user from potentially malicious content. The security software may include identification module 104 and/or determination module 106, and the security software may reside client-side, server-side, and/or intermediate between server 206 and computing device 202 (e.g., edge- or proxy-side). The security software may use profile 230 and attribute 232 to check for acceptable, unacceptable, and/or unknown content at section 209, which may provide a more granular (e.g., section-specific) form of protection from website-based security threats. For example, the security software may assign one value, indicating a higher sensitivity, to attribute 232 for section 209, while assigning a different value, indicating a lower sensitivity, to a corresponding attribute for another section of website 212. Notably, the functions of identification module 104 and/or determination module 106, including filtering or blocking functions, may be performed at any single one, or combination of: (A) web server 208 (by an owner/creator/host of website 212 to protect end users browsing website 212), (B) server 206 (e.g., a third party security vendor server) to protect end users using the security vendor's services while browsing website 212), and/or (C) computing device 202 (e.g., end user client devices).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or managing profiles for sections of websites, as discussed above. Examples of server 206 include, without limitation, application servers and database servers configured to provide various database services and/or run certain software applications. Although shown as separate, in some examples server 206 and web server 208 may be entirely or partially combined.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
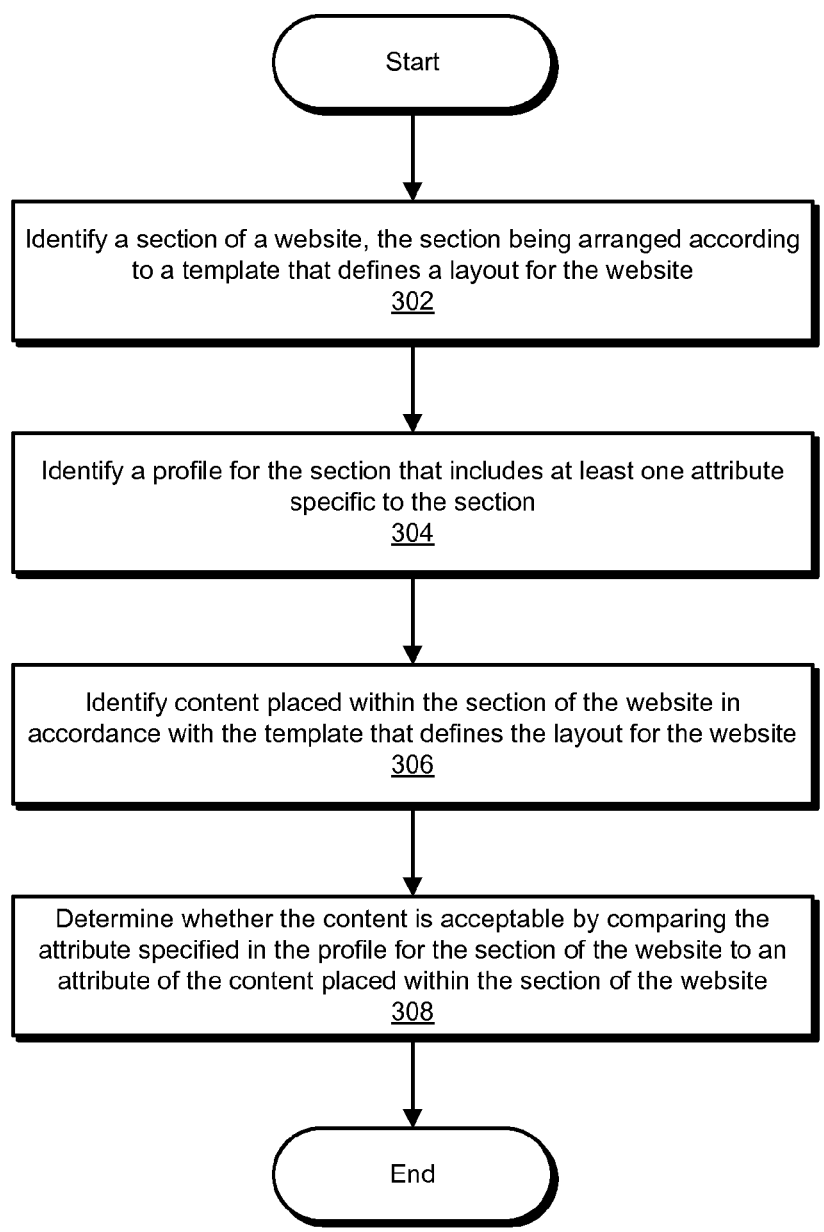
FIG. 3 is a flow diagram of an exemplary method for protecting users from website security risks using templates.

FIG. 3 is a flow diagram of an exemplary computer-implemented method 300 for protecting users from website security risks using templates. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a section of a website that is arranged according to a template that defines a layout for the website. For example, identification module 104 may, as part of computing device 202 in FIG. 2, identify section 209 of website 212, section 209 being arranged according to template 210 that defines a layout for website 212.

As used herein, the phrase "template" generally refers to any structure that indicates how data from multiple sources may be dynamically combined to create a website. In some examples, the multiple sources may include a database, another website, and/or the template itself. In further examples, the template may define a transclusion, which generally refers to the inclusion of one document within another document. For example, the template may define a frame, such as an iframe, that includes a source website within a target website, as a section of the target website. The template may also define the inclusion of a subcomponent, such as a website object, image, video, interactive component, and/or multimedia object within a larger website. The subcomponent may be stored locally (e.g., within the same parent directory as website 212) and/or remotely within a database or other website. In some examples, the template may refer to all or part of HYPERTEXT MARKUP LANGUAGE ("HMTL") code or other language code for the website that defines how data from multiple sources are combined to create the website. In further examples, the template may refer to a template of a web template system, which may correspond to a web publishing tool present in a content management system, web application framework, and/or HTML editors. Similarly, as used herein, the phrase "defines a layout" generally refers to defining how data from multiple sources should be combined to create the website.

As used herein, the phrase "website" generally refers to a finished or generated website, as opposed to incomplete HTML code that may define how a template processor may combine data from multiple sources to generate the finished website. Similarly, as used herein, the phrase "section" of a website generally refers to a portion of a website where content from a separate source (e.g., a separate website or a database) may be dynamically placed according to the template. Sections may be defined by identification tags and/or code delimiters (e.g., brackets), for example. The identification tags may be created by the original creator of the website, and/or by security software processing a finished website according to the techniques discussed below (e.g., FIG. 3).

Identification module 104 may identify section 209 of website 212 in a variety of ways. In some examples, identification module 104 may identify an identification tag or name of section 209, a hash of section 209, and/or a location (e.g., absolute or relative) or position of section 209 within website 212. In additional or alternative examples, identification module 104 may identify section 209 as corresponding to one or more sources or locations from which section 209 receives content that is combined to generate website 212 (e.g., a file path or UNIFORM RESOURCE LOCATOR, whether absolute or relative). Notably, in some examples, a common identifier may identify non-contiguous portions of website 212 as belonging to the same single "section," as that phrase is generally used herein.

In identifying section 209, identification module 104 may refer to template 210, which may be written in a markup language and/or as a style sheet, for example. Identification module 104 may parse and/or traverse template 210 and/or website 212 until reaching a beginning location of section 209, as indicated by a delimiter, brackets, and/or identifier (e.g., name or tag). Identification module 104 may similarly identify an end location of section 209. In these examples, identification module 104 may identify section 209, and/or content within section 209, as the content placed within the beginning and end locations.

Returning to FIG. 3, at step 304 one or more of the systems described herein may identify a profile for the section that includes an attribute specific to the section that indicates acceptable content for the section of the website as distinct from acceptable content for the entire website. For example, identification module 104 may, as part of computing device 202 in FIG. 2, identify profile 230 for section 209 that includes attribute 232 specific to section 209.

As used herein, the phrase "attribute" generally refers to any measurable aspect of section 209 that determination module 106 may analyze in a comparison to determine whether content is acceptable, as discussed further below at step 308 of FIG. 3. Moreover, the phrase "as distinct from acceptable content for the entire website" generally distinguishes profile 230 from profiles that apply to the entirety of website 212. In other words, profile 230 may assign one value to attribute 232 (e.g., a particular sensitivity to obfuscated JAVASCRIPT content) for section 209, while another profile for another section may assign a different value to a corresponding attribute that measures the exact same feature (e.g., a different particular sensitivity to obfuscated JAVASCRIPT content), without using the same value for the entirety of website 212. For example, profile 230 may indicate that a degree of obfuscated JAVASCRIPT is expected and allowed for section 209, whereas other profiles for other sections of website 212 may indicate that no obfuscated JAVASCRIPT is expected or allowed at those other sections.

Identification module 104 may identify profile 230 in a variety of ways. In some examples, identification module 104 may identify profile 230 for section 209 in part by creating profile 230. In further examples, the step of creating profile 230 may be performed by (A) an owner of website 212, who may create and/or host website 212 on web server 208, (B) an endpoint computing system that provides security for users accessing websites through the endpoint computing system, such as computing device 202 in FIG. 2, and/or (C) a management server hosted by a security vendor, such as server 206 in FIG. 2. In the case of the owner of website 212, an administrator may automatically couple profile 230 to website 212, such as by automatically providing profile 230 in response to requests for website 212, by embedding profile 230 within website 212 (or a parent directory or website), and/or by prompting end users with the option to access profile 230. Similarly, an end user computing device, such as computing device 202, may search for, request, and/or access profile 230 from a cloud-based security service, including server 206 (e.g., request a profile 230 based on template 210, section 209, website 212, and/or identifiers or references of these).

In some examples, identification module 104 may identify profile 230 for section 209 in part by adjusting attribute 232. In further examples, identification module 104 may adjust attribute 232 in part by training profile 230, using machine learning, based on content that is known to be acceptable for section 209 of website 212. In one specific example, identification module 104 may identify a number of different instances of content at section 209 (e.g., over a period of time) where the content is known to be safe and not compromised (or not known to be unsafe or compromised). A machine learning algorithm may process the number of different instances to identify thresholds, or permutations of thresholds, for various factors (such as those discussed below), indicating allowable tolerances or deviations for acceptable content. For example, various instances may vary in degrees (e.g., amounts) of obfuscated JAVASCRIPT, while never (or less likely) deviating beyond one or more upper and/or lower thresholds. These thresholds may then define acceptable content for that section of website 212. Identification module 104 may also customize the degree of cushion, or tolerance, permitted for any one measurement to approach or exceed a threshold before triggering a security event. Additionally, or alternatively, identification module 104 may similarly use machine learning on different instances of known bad and/or unknown content to adjust attributes for identifying known bad and/or unknown content.

Figure 4:
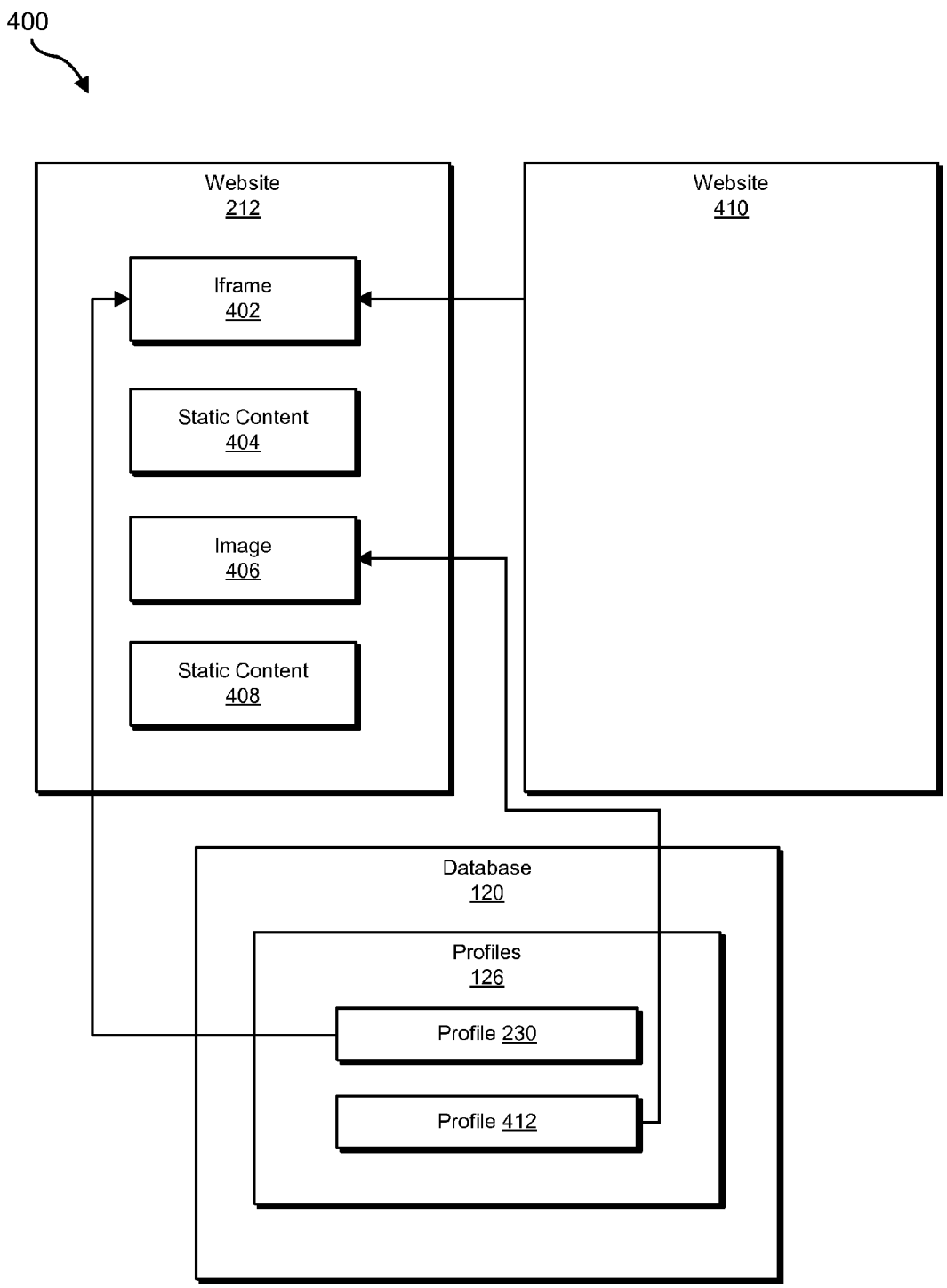
FIG. 4 is a block diagram of exemplary websites and templates illustrating a technique for protecting users from website security risks using templates.

FIG. 4 shows a block diagram 400 of exemplary website 212 and a website 410, as well as exemplary profiles 126. In the example of FIG. 4, website 212 may include four sections, including iframe 402, which may correspond to section 209, static content 404, image 406, and/or static content 408. Both iframe 402 and image 406 may have corresponding section-specific profiles, profile 230 and a profile 412, respectively. As shown in FIG. 4, iframe 402 may define a section that receives content from another source, such as website 410. Similarly, image 406 may define another section that receives content from another source, such as an image hosted on the web (e.g., http://www.cnn.com/image1.jpg). As such, both iframe 402 and image 406 may have corresponding profiles (i.e, profile 230 and profile 412) that define acceptable content for the corresponding section of website 212. In other words, even while website 212 may not change, the external sources (e.g., website 410) that provide dynamic content for iframe 402 and image 406 may change. Profile 230 and profile 412 may define, therefore, what content from these external sources is acceptable for inclusion within iframe 402 and image 406.

Identification module 104 may adjust profile 230 in part by assigning a factor to profile 230 that indicates acceptable content for section 209 of website 212. The factor may include (A) presence of a text line having a predetermined length, (B) use of iframes, (C) percent encoding, (D) a ratio of concatenated strings to non-concatenated strings, and/or (E) use of content hosted on foreign domains.

Figure 5:
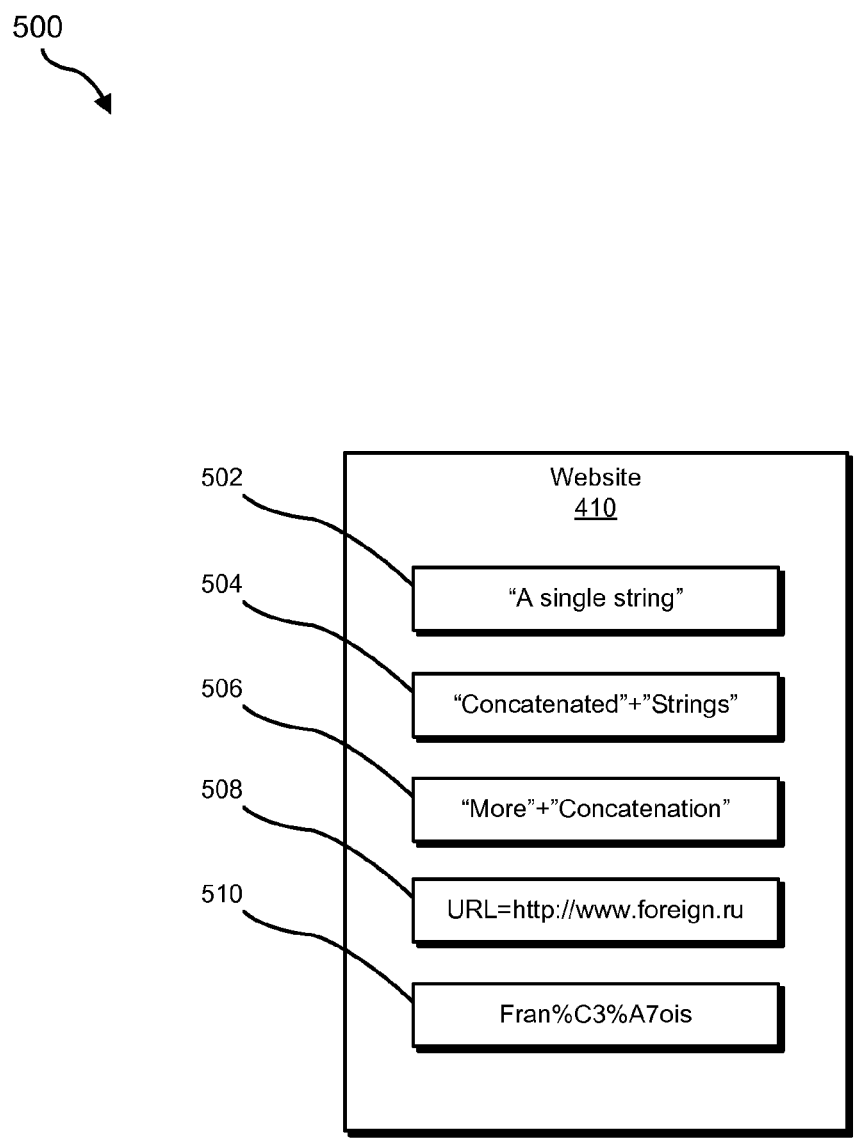
FIG. 5 is a block diagram of exemplary factors that may indicate acceptable content for a section of the website.

FIG. 5 shows a block diagram 500 of website 410 (included within iframe 402), and block diagram 500 may illustrate some of the exemplary factors discussed above. As shown in FIG. 5, website 410 may include a single non-concatenated string 502, a concatenated string 504, another concatenated string 506, a reference 508 to content on a foreign domain, and an instance 510 of percent encoding. Determination module 106 may determine whether content from website 410 is acceptable for placing within section 209, as discussed further below at step 308 of FIG. 3.

Returning to step 304 and FIG. 4, identification module 104 may further identify another profile for another section of the website that includes an attribute specific to the other section. For example, in addition to identifying profile 230 for iframe 402, identification module 104 may also identify profile 412 for image 406. Profile 412 may contain a corresponding attribute that indicates acceptable content for image 406 of website 212 as distinct from acceptable content for the entirety of website 212. In one specific example, the attribute and corresponding attribute may indicate whether content from a foreign domain is permitted to be placed within the respective section of website 212. In this specific example, profile 230 for iframe 402 may indicate that some content (e.g., from a foreign domain) is allowable that the other profile 412 for image 406 indicates is not allowable. Moreover, profile 230 and/or profile 412 may be digitally signed by a security service (e.g., certified by a certificate authority) to ensure the integrity and authenticity of the respective profile.

Returning to FIG. 3, at step 306 one or more of the systems described herein may identify content placed within the section of the website in accordance with the template that defines the layout for the website. For example, identification module 104 may, as part of computing device 202 in FIG. 2, identify content placed within section 209 of website 212 in accordance with template 210 that defines the layout for website 212.

Identification module 104 may identify content placed within section 209 of website 212 in a variety of ways. In general, identification module 104 may identify content placed within section 209 in any manner that parallels how identification module 104 identifies section 209 itself, as discussed above for step 302 of FIG. 3. For example, identification module 104 may parse one or more sources (e.g., markup or other language sources) to find a beginning and/or end location for section 209. Identification module 104 may similarly search website 212 for a tag, name, identifier, reference (e.g., source location), or other identifying feature of section 209. In these cases, upon locating section 209, identification module 104 may similarly identify content placed within section 209 (e.g., within beginning/end locations, delimiters, and/or brackets, corresponding to identified section 209, for example).

Returning to FIG. 3, at step 308 one or more of the systems described herein may determine whether the identified content is acceptable by comparing the attribute specified in the profile for the section of the website to an attribute of the content placed within the section of the website. For example, determination module 106 may, as part of computing device 202 in FIG. 2, determine whether the identified content is acceptable by comparing attribute 232 specified in profile 230 for section 209 of website 212 to an attribute of the content placed within section 209 of website 212.

Determination module 106 may determine whether the identified content is acceptable by comparing attributes in a variety of ways. Returning to FIG. 5, determination module 106 may compare attribute 232 with a corresponding attribute of website 410. For example, attribute 232 may indicate that a ratio of 1/3 concatenated strings to total strings, or less, is acceptable. In contrast, as shown in FIG. 5, website 410 (which may form a template-based section of website 212 shown in FIG. 4, as discussed above) contains a ratio of 2/3, because there are two instances, 504 and 506, of concatenated strings and a single non-concatenated string 502. Although this example uses the value of "1/3," attribute 232 may indicate acceptable content based on any (weighted or non-weighted) number or proportion of concatenated and/or non-concatenated strings.

Similarly, determination module 106 may determine that a text line, such as a line containing string 502, has at least a predetermined length. Determination module 106 may, therefore, determine that the content is unacceptable, or less likely to be acceptable, based on the length of the text line. In general, determination module 106 may increase an estimated likelihood of content being unacceptable in proportion to the length of one or more lines within the content, because unacceptable content (e.g., malware attacks) tend to use lengthy and unreadable lines of text.

Moreover, attribute 232 may indicate that content from foreign domains is not acceptable. Accordingly, determination module 106 may compare attribute 232 with website 410, which includes reference 508 to a foreign domain. Determination module 106 may, therefore, determine that the content of website 410 is not acceptable. Determination module 106 may similarly determine that the content of website 410 is not acceptable based on the presence, or amount, of percent encoding, indicated by instance 510 of percent encoding. Percent encoding may replace reserved characters, such as slashes, with special character sequences, according to one of various specifications. As one further example, determination module 106 may determine that the content of website 410 is not acceptable based in part on website 410 itself containing iframes and/or based in part on iframe 402 in website 212 attempting to incorporate website 410.

Moreover, although the above examples may use binary evaluations in one direction (e.g., not acceptable), the disclosed systems and methods may similarly use (weighted or non-weighted) granular evaluations for one or more factors. For example, determination module 106 may increase or decrease a running total based on the presence, and/or degree, of any factor, using any weighted or non-weighted combination of boolean or business logic factors. Determination module 106 may similarly determine whether any total or resulting value satisfies one or more customizable and/or predetermined threshold values.

In some examples, determination module 106 may determine whether the identified content is acceptable in part by triggering a security event. For example, upon determining that the identified content is not acceptable and/or that the identified content is acceptable but triggers a security precaution, determination module may enable a no scripting mode, create a sandboxed copy of website 212, and/or prevent or inhibit (e.g., require user confirmation prior to loading) loading of website 212 and/or section 209 (while allowing part or a remainder of website 212 to load). Determination module 106 may similarly disable access to, or functionality for, FLASH, PORTABLE DOCUMENT FORMAT files, JAVA, and/or any other active functionality known to be associated with increased security risks.

In further examples, determination module 106 may determine whether the identified content is acceptable in part by obtaining a reputation for website 212 and/or section 209 of website 212. Determination module 106 may consider the obtained reputation as a factor when performing the comparison of attributes to determine whether the identified content is acceptable. For example, a reputation indicating a greater likelihood of maliciousness or bad content may increase a comparison score showing that the identified content does not match an attribute for acceptable content (and vice versa). Moreover, the obtained reputation may be based on an age of profile 230. For example, a reputation for maliciousness or bad content may increase in proportion to an age of the profile (or upon meeting one or more thresholds of age), such that stale profiles are less likely to be trusted or useful. The obtained reputation may similarly be based on a number or proportion of end users who report problems, attacks, and/or malware signature hits associated with website 212.

In one example, determination module 106 may further detect that profile 230 for section 209 of website 212 includes, or constitutes, a legacy version of profile 230 (e.g., a cached copy of profile 230, which may be stored client-side) that is older than a more recent version of profile 230, which may be available online through a security vendor. In this example, determination module 106 may further determine whether the identified content is acceptable in part by inhibiting access to the content until obtaining the more recent version of profile 230. Determination module 106 may thereby help ensure that the most recent and reliable version of profile 230 is used to protect users from potential security threats.

As explained above, the disclosed systems and methods may determine acceptable content for a section of a website, as distinct from the entire website. The disclosed systems and methods may, therefore, provide more granular evaluations of acceptable content for websites. For example, the disclosed systems and methods may use a higher sensitivity to unacceptable content for one section of a website (along one or more dimensions or types of content), while using a lower sensitivity to unacceptable content for another section (or remainder) of the website. Conventional techniques may be unable to use a higher sensitivity without applying the higher sensitivity to the entire website. These conventional systems may thereby create false positives when the higher sensitivity triggers security events for sections of websites that contain suspicious but ultimately safe content. In general, the disclosed systems and methods provide a technique for more effectively, and in a more granular manner, monitoring and processing (e.g., filtering) content placed within a section of a website using a template system.

Figure 6:
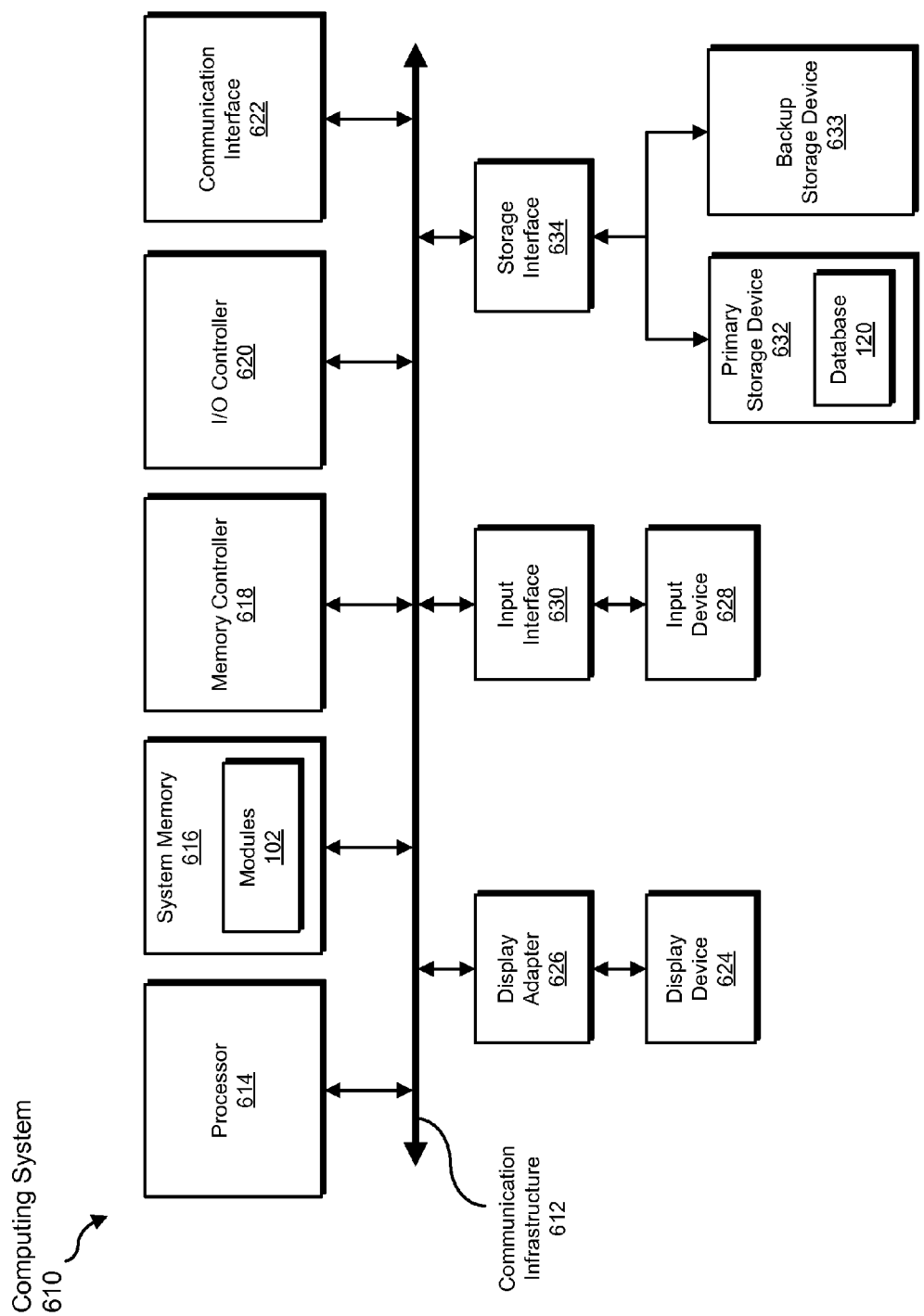
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
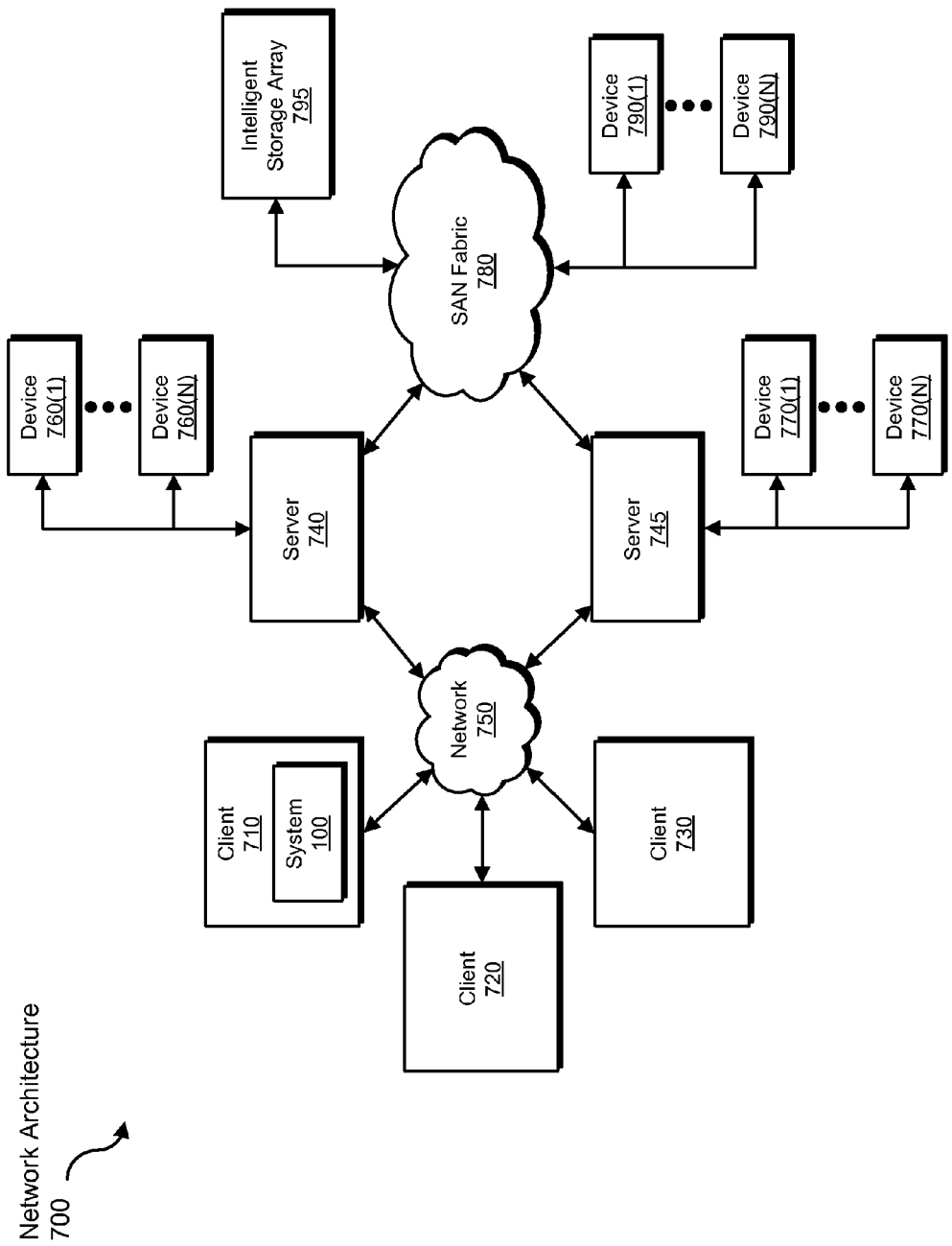
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting users from website security risks using templates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to display a website, a template for the website, and/or website code to be transformed by a template processor for display as a finalized webpage, transform any one or more of these items by generating a finalized website for display and/or triggering a security event to inhibit access to part or all of the website or otherwise protect a user from potential threats associated with the website, output a result of the transformation to an output device or display, use the result of the transformation to protect users from security threats associated with websites, and store the result of the transformation to memory or disk. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users from website security risks using templates, at least a portion of the method being performed by a computing device comprising at least one microprocessor, the method comprising:
    identifying a section of a website, the section being arranged according to a template that defines a layout for the website;
    identifying a profile for the section that includes an attribute specific to the section, the attribute indicating whether content for the section of the website is non-malicious as distinct from indicating whether content for the entire website is non-malicious;
    identifying content placed within the section of the website in accordance with the template that defines the layout for the website;
    determining, by the computing device, whether the identified content is non-malicious by comparing the attribute specified in the profile for the section of the website to an attribute of the content placed within the section of the website.

2. The method of claim 1, wherein identifying the profile for the section that includes the attribute specific to the section comprises creating the profile.

3. The method of claim 2, wherein the step of creating the profile is performed by at least one of:
    an owner of the website;
    an endpoint computing system that provides security for users accessing websites through the endpoint computing system;
    a management server hosted by a security vendor.

4. The method of claim 1, wherein identifying the profile for the section that includes the attribute specific to the section comprises adjusting the attribute.

5. The method of claim 4, wherein adjusting the attribute comprises training the profile, using machine learning, based on content that is known to be non-malicious for the section of the website.

6. The method of claim 4, wherein adjusting the profile comprises assigning at least one factor to the profile that indicates non-malicious content for the section of the website.

7. The method of claim 6, wherein the factor comprises at least one of:
- presence of a text line having at least a predetermined length;
- use of iframes;
- percent encoding;
- a ratio of concatenated strings to non-concatenated strings;
- use of content hosted on foreign domains.

8. The method of claim 1, wherein the template comprises a style sheet that defines the layout for the website.

9. The method of claim 1, further comprising identifying another profile for another section of the website that includes an attribute specific to the other section, the attribute indicating whether content for the other section of the website is non-malicious as distinct from indicating whether content for the entire website is non-malicious, wherein the profile for the section indicates that some content is allowable that the other profile for the other section indicates is not allowable.

10. The method of claim 1, wherein determining whether the identified content is non-malicious comprises triggering a security event.

11. The method of claim 10, wherein the security event comprises at least one of:
- enabling a no scripting mode;
- creating a sandboxed copy of the website;
- preventing loading of the website.

12. The method of claim 1, wherein determining whether the identified content is non-malicious comprises obtaining a reputation for at least one of:
- the website;
- the section of the website.

13. The method of claim 12, wherein the reputation is based on an age of the profile.

14. The method of claim 1, wherein the profile for the section that includes the attribute specific to the section is digitally signed.

15. The method of claim 1, further comprising detecting that the profile for the section of the website comprises a legacy version of the profile that is older than a more recent version of the profile.

16. The method of claim 15, wherein determining whether the identified content is non-malicious comprises inhibiting access to the content until obtaining the more recent version of the profile.

17. A system for protecting users from website security risks using templates, the system comprising:
- an identification module, stored in memory, that:
  - identifies a section of a website, the section being arranged according to a template that defines a layout for the website;
  - identifies a profile for the section that includes an attribute specific to the section, the attribute indicating whether content for the section of the website is non-malicious as distinct from indicating whether content for the entire website is non-malicious;
  - identifies content placed within the section of the website in accordance with the template that defines the layout for the website;
- a determination module, stored in memory, that determines whether the identified content is non-malicious by comparing the attribute specified in the profile for the section of the website to an attribute of the content placed within the section of the website;
- at least one physical processor configured to execute the identification module and the determination module.

18. The system of claim 17, wherein the template comprises a style sheet that defines the layout for the website.

19. The system of claim 17, wherein the determination module determines whether the identified content is non-malicious at least in part by triggering a security event.

20. A non-transitory computer-readable medium comprising one or more computer-executable instructions that, when executed by at least one processor of a computing device, cause the computing device to:
- identify a section of a website, the section being arranged according to a template that defines a layout for the website;
- identify a profile for the section that includes an attribute specific to the section, the attribute indicating whether content for the section of the website is non-malicious as distinct from indicating whether content for the entire website is non-malicious;
- identify content placed within the section of the website in accordance with the template that defines the layout for the website;
- determine whether the identified content is non-malicious by comparing the attribute specified in the profile for the section of the website to an attribute of the content placed within the section of the website.

* * * * *